(12) United States Patent
Sheu

(10) Patent No.: US 9,419,728 B2
(45) Date of Patent: Aug. 16, 2016

(54) ELECTRIC POWER TRANSMISSION SYSTEM

(71) Applicant: HON HAI PRECISION INDUSTRY CO., LTD., New Taipei (TW)

(72) Inventor: Yi-Zhong Sheu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 259 days.

(21) Appl. No.: 14/296,640

(22) Filed: Jun. 5, 2014

(65) Prior Publication Data

US 2014/0361640 A1    Dec. 11, 2014

(30) Foreign Application Priority Data

Jun. 7, 2013   (TW) .............................. 102120375 A

(51) Int. Cl.
*G05F 3/06*        (2006.01)
*H04B 10/80*       (2013.01)

(52) U.S. Cl.
CPC .................................... *H04B 10/807* (2013.01)

(58) Field of Classification Search
CPC ........................................................ H02J 5/005
USPC ......................................................... 307/151
See application file for complete search history.

(56) References Cited

U.S. PATENT DOCUMENTS

2009/0296751 A1* 12/2009 Kewitsch ............... H01S 3/2383
                                                    372/18
2015/0229097 A1*  8/2015 Oba ...................... H01S 3/1068
                                                    372/6

* cited by examiner

*Primary Examiner* — Rexford Barnie
*Assistant Examiner* — Toan Vu
(74) *Attorney, Agent, or Firm* — ScienBiziP, P.C.

(57) ABSTRACT

An electric power transmission system includes an electrical-optical conversion device and multiple photoelectric conversion devices converting electricity to light. The electrical-optical conversion device includes a high-voltage source, a laser diode unit, a light combiner, and multiple optical fibers. The laser diodes receive the high-voltage source. The light combiner includes multiple first input ends and multiple first output ends. A first optical fiber interconnects a laser diode and a first input end. An end of a third optical fiber optically connects to a first output end. Each photoelectric conversion device includes a second light splitter, further optical fibers, and a photodiode unit. The second light splitter includes a third input end and a plurality of third output ends. The third input end optically connects to another end of a third optical fiber. A fourth optical fiber optically interconnects a third output end and a photodiode.

8 Claims, 1 Drawing Sheet

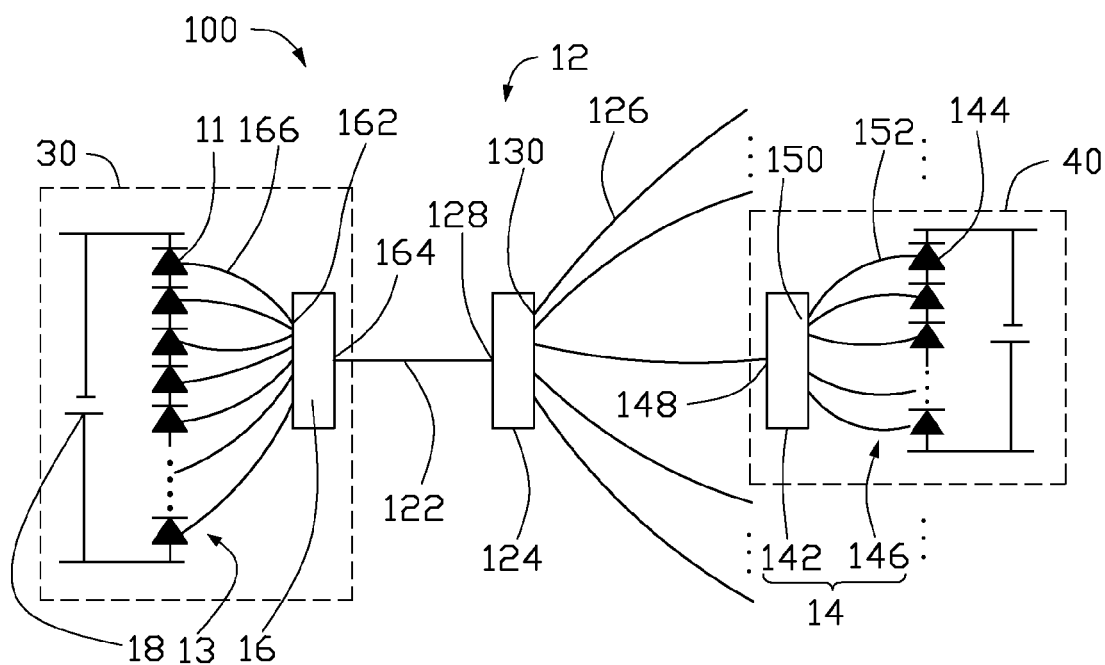

ELECTRIC POWER TRANSMISSION SYSTEM

FIELD

The subject matter herein generally relates to electric power transmissions.

BACKGROUND

Generating stations transmit electric power with high transmission voltage in order to reduce transmission losses of the electric power. Between the generating station and consumers, electric power may flow through several substations at different voltage levels. The substations including transformers that change voltage levels between high transmission voltages and lower distribution voltages, or at the interconnection of two different transmission voltages.

BRIEF DESCRIPTION OF THE DRAWING

Implementations of the present technology will now be described, by way of example only, with reference to the attached FIGURE.

The FIGURE is a diagrammatic view of an embodiment of an electric power transmission system.

DETAILED DESCRIPTION

Numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawing is not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like. The references to "an" or "one" embodiment are not necessarily to the same embodiment, and such references mean "at least one." The references "a plurality of" and "a number of" mean "at least two."

The present disclosure is described in relation to an electric power transmission system. The electric power transmission system includes a substation, optical transmission member, and a plurality of consumer terminals. The substation includes a high-voltage source, a laser diode unit, a light combiner, a plurality of first optical fibers, and a second optical fiber. The high-voltage source provides a high voltage $V_H$. The laser diode unit includes a plurality of laser diodes connected in series. A positive electrode and a negative electrode of the laser diode unit are coupled with a positive electrode and a negative electrode of the high-voltage source respectively. A number $M_1$ of the laser diodes can be calculated by formula $M_1=V_H/V_1$, wherein the $V_1$ represents an operating voltage of a laser diode. The light combiner includes a plurality of first input ends and a first output end. A plurality of first optical fibers correspond to the laser diodes. An end of a first optical fiber is optically coupled with a laser diode, and another end of the first optical fiber is optically coupled with a first input end. An end of second optical fiber is optically coupled with a first output end. The consumer terminal includes a second light splitter, a plurality of fourth optical fibers, and a photodiode unit. The second light splitter includes a third input end and a plurality of third output ends. The third output ends correspond to the fourth optical fibers. A third output end is optically coupled with an end of a fourth optical fiber. The third input end is optically coupled with another end of the second optical fiber. The photodiodes unit includes a plurality of photodiodes connected in series. The photodiodes correspond to the fourth optical fibers. A photodiode is optically coupled with another end of a fourth optical fiber. A number $M_2$ of the photodiodes can be calculated by a formula $M_2=V_N/V_2$, wherein $V_2$ represents a photoelectric conversion voltage of a photodiode, and $V_N$ represents a voltage of the consumer terminal.

The FIGURE illustrates an embodiment of an electric power transmission system 100. The electric power transmission system 100 includes an electrical-optical conversion device 10, an optical transmission member 12, and a plurality of photoelectric conversion devices 14.

In one embodiment, the electrical-optical conversion device 10 is mounted in a substation 30 which is coupled with consumer terminals 40. The electrical-optical conversion device 10 includes a high-voltage source 18, a laser diode unit 13, and a light combiner 16. The laser diode unit 13 includes a plurality of laser diodes 11 connected to each other in series.

The high-voltage source 18 is configured to provide a high voltage $V_H$. In one embodiment, the high-voltage source 18 can be high voltage electricity transmitted from a prior substation or from a generating station to the present substation 30. The high voltage $V_H$ can be about 69 Kilovolts (KV), 22 KV or 11 KV.

The positive and negative electrodes of the laser diode unit 13 connect to the positive and negative electrodes of the high-voltage source 18 respectively, thereby activating the laser diodes 11 in the laser diode unit 13. A number of the laser diodes 11 in the laser diode unit 13 can be calculated by a formula: $M_1=V_H/V_1$, wherein $M_1$ represents a number of the laser diodes 11, and $V_1$ represents an operating voltage of a laser diode 11.

The light combiner 16 includes a plurality of first input ends 162 and a first output end 164. The first input ends 162 correspond to the laser diodes 11. Each first input end 162 is connected to a corresponding laser diode 11 through a first optical fiber 166. The optical fibers 166 correspond to the laser diodes 11. One end of a first optical fiber 166 is optically coupled with a laser diode 11, and the other end of the first optical fiber 166 is optically coupled with a first input end 162. Each optical fiber 166 is configured to transmit light emitted from a laser diode 11 to the light combiner 16. The light combiner 16 is configured to combine a plurality of beams of light transmitted through the optical fibers 166 into one beam of light, and then transmit the one beam of light out of the substation 30 through the first output end 164.

The optical transmission member 12 includes a second optical fiber 122, a first light splitter 124, and a plurality of third optical fibers 126. One end of the second optical fiber 122 is optically coupled with the first output end 164 to receive light emitted from the first output end 164. The first light splitter 124 includes a second input end 128 and a plurality of second output ends 130. The second input end 128 is optically coupled with the other end of the second optical fiber 122. A second output end 130 is optically coupled with a third optical fiber 126. The third optical fibers 126 correspond to the second output ends 130. The first light splitter 124 is configured to receive the light transmitted through the second optical fibers 122 and to split the light into a plurality of beams of light. The multiple beams of light respectively enter the third optical fibers 126.

Each photoelectric conversion device 14 is mounted in a consumer terminal 40. Each photoelectric conversion device 14 includes a second light splitter 142 and a photodiode unit 146 having a plurality of photodiodes 144 connected to each other in series. The second light splitter 142 includes a third input end 148 and a plurality of third output ends 150. The third input end 148 is optically coupled with a third optical fiber 126. A plurality of fourth optical fibers 152 correspond to the third output ends 150. One end of a fourth optical fiber 152 is optically coupled with a third output end 150. The second light splitter 142 is configured to receive light emitted from a third optical fiber 126 and to split the light into a plurality of respective beams toward the photodiodes 144 through the fourth optical fibers 152. The photodiodes 144 correspond to the fourth optical fibers 152. The photodiode 144 is configured to convert light emitted from a fourth optical fiber 152 into electricity, thereby generating a predetermined voltage at opposite ends of the photodiodes unit 146 for the consumer terminal 40. The voltage between the opposite ends of the photodiodes unit 146 can be a domestic or household voltage $V_N$, such as 110V or 220V. In one embodiment, a number of the photodiodes 144 in the photodiodes unit 146 can be calculated by a formula as follow: $M_2=V_N/V_2$, wherein $M_2$ represents a number of the photodiodes 144, and $V_2$ represents a photoelectric conversion voltage of a photodiode 146.

In another embodiment, there can be a plurality of light combiners 16 or the light combiner 16 can include a plurality of first output ends 164. In this situation, the first light splitter 124 and the second optical fiber 122 can be omitted. The first output ends 164 correspond to the third optical fibers 126. The third optical fibers 126 correspond to the third input ends 148. One end of a third optical fiber 126 is optically coupled with a first output end 164, and the other end of the third optical fiber 126 is optically coupled with a third input end 148.

The embodiments shown and described above are only examples. Many details are often found in the art such as the other features of an electric power transmission system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. An electric power transmission system comprising:
an electrical-optical conversion device comprising:
a high-voltage source configured to provide a high voltage $V_H$;
a laser diode unit having a plurality of laser diodes coupled to one another in series,
laser diodes wherein positive electrodes and negative electrodes of the unit are respectively coupled to positive electrodes and negative electrodes of the high-voltage source, and a number of the plurality is calculated by $M_1=V_H/V_1$, wherein $M_1$ is a number of the laser diodes, $V_H$ is the high voltage, and $V_1$ is an operating voltage of a laser diode;
a light combiner having a plurality of first input ends and a plurality of first output ends, wherein each first input end corresponds with a respective one of the plurality of laser diodes;
a plurality of first optical fibers each having a first end optically coupled to one of the plurality of laser diodes and a second end optically coupled to a first one of the plurality of input ends;
a plurality of third optical fibers each having an end being optically coupled to a first output end;
a plurality of photoelectric conversion device wherein each photoelectric conversion device comprises:
a second light splitter comprising a third input end and a plurality of third output ends;
a plurality of fourth optical fibers, wherein the third output ends correspond with a respective one of the plurality of the fourth optical fibers and the third input end is optically coupled to another end of the third optical fiber;
wherein the third output end is optically coupled to an end of one of the plurality of fourth optical fibers;
a photodiode unit having a plurality of photodiodes coupled to one another in series,
photodiodes corresponding to the fourth optical fibers are respectively optically coupled with the other end of a fourth optical fiber, and a number of the photodiodes is calculated by $M_2=V_N/V_2$, wherein $M_2$ is a number of the photodiodes, $V_N$ is a domestic or household voltage, and $V_2$ is a conversion voltage of a photodiode.

2. The electric power transmission system of claim 1, wherein the high voltage $V_H$ is about 69 KV, 22 KV or 11 KV.

3. The electric power transmission system of claim 1, wherein the domestic or household voltage $V_N$ is about 110V or 220V.

4. The electric power transmission system of claim 1, wherein the electrical-optical conversion device is mounted in a substation which is coupled with consumer terminals, the photoelectric conversion device is mounted in a consumer terminal.

5. An electric power transmission system comprising:
an electrical-optical conversion device comprising:
a high-voltage source configured to provide a high voltage $V_H$;
a laser diode unit having a plurality of laser diodes coupled to one another in series,
laser diodes wherein positive electrodes and negative electrodes of the unit respectively coupled to positive electrodes and negative electrodes of the high-voltage source, and a number of the plurality is calculated by $M_1=V_H/V_1$, wherein $M_1$ is a number of the laser diodes, $V_H$ is the high voltage, and $V_1$ is an operating voltage of a laser diode;
a light combiner having a plurality of first input ends and a first output end; wherein each first input end corresponds with a respective one of the plurality of laser diodes;
a plurality of first optical fibers each having a first end optically coupled to one of the plurality of laser diodes and a second end optically coupled to a first one of the plurality of input ends;

an optical transmission member comprising:
- a second optical fiber having an end optically coupled with the first output end;
- a first light splitter having a second input end and a plurality of second output ends, wherein the second input end is optically coupled with another end of the second optical fiber; and
- a plurality of third optical fibers each having an end optically coupled to one of the plurality of the second output ends;

a plurality of photoelectric conversion devices wherein each photoelectric conversion device comprises:
- a second light splitter comprising a third input end and a plurality of third output ends;
- a plurality of fourth optical fibers, wherein the third output ends corresponds with one of the plurality of the fourth optical fibers and the third input end is optically coupled with another end of a third optical fiber;
- wherein the third output end is optically coupled to an end of one of fourth optical fibers;
- a photodiode unit having a plurality of photodiodes coupled to one another in series, photodiodes corresponding to the fourth optical fibers are respectively optically coupled with the other end of a fourth optical fiber, and a number of the photodiodes is calculated by formula $M_2=V_N/V_2$, wherein $M_2$ is a number of the photodiodes, $V_N$ is a domestic or household voltage, and $V_2$ is a conversion voltage of a photodiode.

6. The electric power transmission system of claim 5, wherein the high voltage $V_H$ is about 69 KV, 22 KV or 11 KV.

7. The electric power transmission system of claim 5, wherein the domestic or household voltage $V_N$ is about 110V or 220V.

8. The electric power transmission system of claim 5, wherein the electrical-optical conversion device is mounted in a substation which is coupled with consumer terminals, the photoelectric conversion device is mounted in a consumer terminal.

* * * * *